Patented Aug. 25, 1942

2,293,876

UNITED STATES PATENT OFFICE 2,293,876

AMINO COMPOUND

Eugene H. Woodruff, Kalamazoo, Mich., assignor to The Upjohn Company, Kalamazoo, Mich.

No Drawing. Application May 25, 1939, Serial No. 275,640

3 Claims. (Cl. 260—570.8)

This invention relates to improvements in amino compounds.

This invention relates to a new and useful product which is physiologically active as a therapeutic agent for treating asthma or the like. This product is particularly useful because of its bronchodilator effect. The objects of this invention are:

First, to produce a new and useful product.

Second, to produce such a product which is physiologically active as a therapeutic agent and which may be employed for its bronchodilator effect in treating asthma without the ill effects which may result from pressor effect in treating the patient.

Third, to produce such a substance of low toxicity.

Fourth, to produce such a substance which may be administered orally.

Other objects and advantages pertaining to details will appear from the description to follow. The invention is defined in the claims.

My new product may be termed β-3,4-dimethoxyphenyl-n-propylamine. The structural formula is as follows:

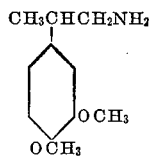

I produce this product in the following manner:

Ethyl-(βmethyl)-o-3,4 dimethoxy cinnamate is formed as follows: 89 grams (0.5 mole) of 3,4 dimethoxy acetophenone, 100 grams (0.6 mole) ethyl bromacetate, 50 grams of zinc-copper shavings (8 per cent copper) and 250 cc. of anhydrous benzene are placed in a one-liter round-bottomed flask equipped with a reflux condenser. The reactants are heated on a steam bath until a vigorous reaction sets in whereupon the heat is withdrawn until the violence has subsided. The solution is then refluxed an additional 45 minutes to complete the reaction.

After cooling the zinc complex is decomposed by adding a large excess of cold dilute sulfuric acid. The solution is then filtered with suction to remove any undissolved zinc and copper. The orange colored benzene solution is separated from the aqueous layer and dried over anhydrous magnesium sulfate.

The dried benzene solution is refluxed for 30 minutes with 30 cc. of phosphorous oxychloride in a one-liter round-bottomed flask. The cooled deeply colored solution is washed twice with cold water to remove the phosphorous oxychloride and then dried over anhydrous magnesium sulfate. After removal of the solvent the product is distilled under reduced pressure. This product has a boiling point of 145–8° at 90 mm. of mercury. This yields 94 grams or 75 per cent of the theoretical.

3,4 dimethoxy-β-methyl cinnamic acid is then formed from this product as follows:

125 grams (0.5 mole) of the ester is saponified by refluxing for two hours with 56 grams (1 mole) of potassium hydroxide made up to a 50 per cent solution, enough alcohol being added to completely dissolve the ester. After refluxing for two hours the solution is poured into two liters of water. The alcohol is removed under diminished pressure and the cooled alcohol-free solution extracted with ether to remove unsaponified material. After expelling the ether, the solution is acidified with concentrated hydrochloric acid. The acid may be recrystallized from a benzene-petroleum ether mixture, and has a melting point of 138–140°.

β-(3,4 dimethoxy phenyl) butyric acid is then formed from this product as follows:

222 grams (1.0 mole) of o-methoxy-β-methyl cinnamic acid is added to two liters of 8 per cent sodium sulfate solution containing 20 grams of sodium hydroxide. The solution is reduced electrolytically using a mercury cathode and a sheet lead anode. An apparatus that may be used for amounts of this size is described in "Organic Synthesis," col. vol. I, p. 304, H. Gilman, editor. John Wiley & Sons, N. Y.

60.0 ampere hours are used for reduction, this being about 10 per cent in excess of the amount theoretically necessary. The solution in the cathode compartment is filtered and acidified with sulfuric acid. Upon recrystallization from benzene-petroleum ether a solid melting point of 86–7° was obtained. This yields 213 grams or 95 per cent of the distilled material.

β-(3,4-dimethoxy phenyl) butyryl chloride is then formed from this product as follows:

To 180 grams (1.5 mole) of thionyl chloride contained in a one-liter round-bottomed flask equipped with a reflux condenser and an efficient gas absorption trap is dropped over ¾ hour 224 grams (1.0 mole) of β-(3,4-dimethoxy phenyl) butyric acid dissolved in chloroform. The flask is warmed gently on a steam bath during the addition of the acid and for one-half hour longer.

The acid chloride does not distill and is used without isolation in the next step.

β-(o-methoxy phenyl) butyramide is then formed from this product as follows:

1500 cc. of 27 per cent ammonia water is placed in a 5-liter three-necked flask equipped with a mechanical stirrer and cooled to +10° C. by means of an ice-salt mixture. To the ice cold ammonia 242.5 grams (1.0 mole) of β-(3,4 dimethoxy phenyl) butyryl chloride in chloroform is added at such a rate as to keep the temperature of the solution at +10 to +15° C. Gaseous $NH_3$ is bubbled into the solution at the same time so as to keep the aqueous solution saturated with the gas during the reaction. The solution is stirred 30 minutes after the addition of the acid chloride and is then extracted with more chloroform to remove the amide. The chloroform is removed by distillation. The yield is 200 grams or 90 per cent of the theoretical. The amide may be crystallized from benzene and has a melting point at 131° C.

β-3,4-dimethoxy phenyl-n-propyl amine is then formed from this product as follows:

In a 2-liter three-necked round-bottomed flask equipped with a thermometer and a mechanical stirrer is placed 80 grams of sodium hydroxide dissolved in 800 cc. of distilled water and 88 grams of liquid bromine. The solution is cooled to 15-20° C. and 111.5 grams (0.5 mole) β-(3,4-dimethoxy phenyl) butyramide ground to pass a 20 mesh sieve is dusted over the surface of the stirred solution as fast as it will dissolve.

When the amide is in solution an air-cooled condenser is added and the solution warmed to 70° for one hour. Eighty grams of solid sodium hydroxide are added and the solution heated with stirring at 80° for one and one-half hours. Upon cooling the oil is extracted from the aqueous solution with ether, dried over anhydrous magnesium sulfate and on removal of the solvent vacuum distilled. This product has a boiling point of 160° at 14 mm. of mercury. This yields 71 grams or 74 per cent of the theoretical.

The hydrochloride melting point 205-6° C. may be prepared by bubbling dry HCl gas into an absolute ether solution of the amine.

This product is particularly useful for treating asthma or the like because of its significant broncho-dilator effect and the low pressor effect which is substantially negligible in therapeutic doses. The pressor effect is $1/675$ that of epinephrine. The broncho-dilator effect is substantially $1/20$ that of epinephrine. The toxicity is such that 140 mg. per kilo body weight will kill 50% of the rats to which the product is administered. This toxicity is very low.

The low pressor effect is particularly significant because when the product is used therapeutically the side reactions such as nervousness, insomnia and heart disturbances are eliminated. The product is particularly useful because of the prolonged effect which is much longer than that of epinephrine.

The free amine may be employed and administered orally or the chloride or other salts may be employed. Suitable salts are those of inorganic mineral acids such as sulfuric or phosphoric. Salts of carboxylic acids such as acetic may also be employed, as may the salts of heavy organic acids such as oleic, stearic and palmitic.

Having thus described my invention, what I claim as new and desire to secure by Letters Patent is:

1. A salt of β-3,4-dimethoxyphenyl-n-propylamine having a pressor effect about $1/675$ that of epinephrine and a bronchodilator effect about $1/20$ that of epinephrine, and having a low toxicity.

2. β-3,4-dimethoxyphenyl-n-propylamine having a pressor effect about $1/675$ that of epinephrine and a bronchdilator effect about $1/20$ that of epinephrine, and having a low toxicity.

3. A salt of an acid selected from a group consisting of inorganic mineral acids, organic carboxylic acids and β-3,4-dimethoxyphenyl-n-propylamine having a pressor effect about $1/675$ that of epinephrine and a bronchodilator effect about $1/20$ that of epinephrine and having a low toxicity.

EUGENE H. WOODRUFF.